April 20, 1943.  C. S. CRAFTS ET AL  2,317,095
METHOD AND MEANS FOR MAINTAINING REGISTER IN MULTIUNIT PRESSES
Filed Dec. 27, 1940  6 Sheets-Sheet 4
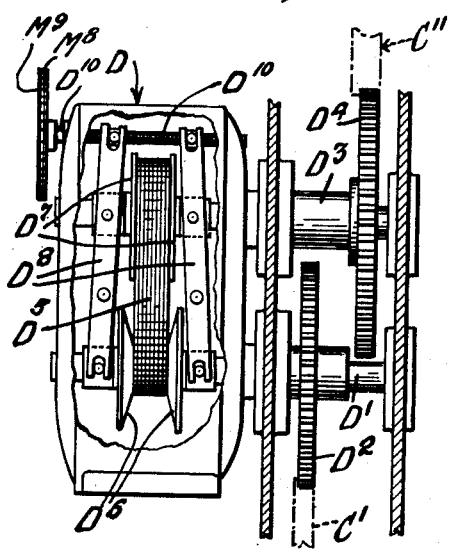
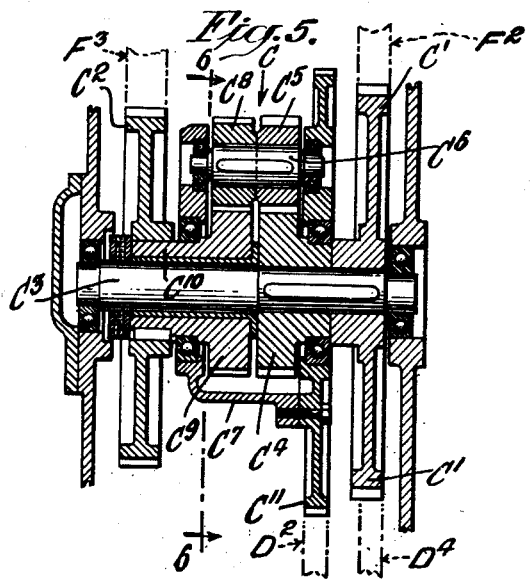
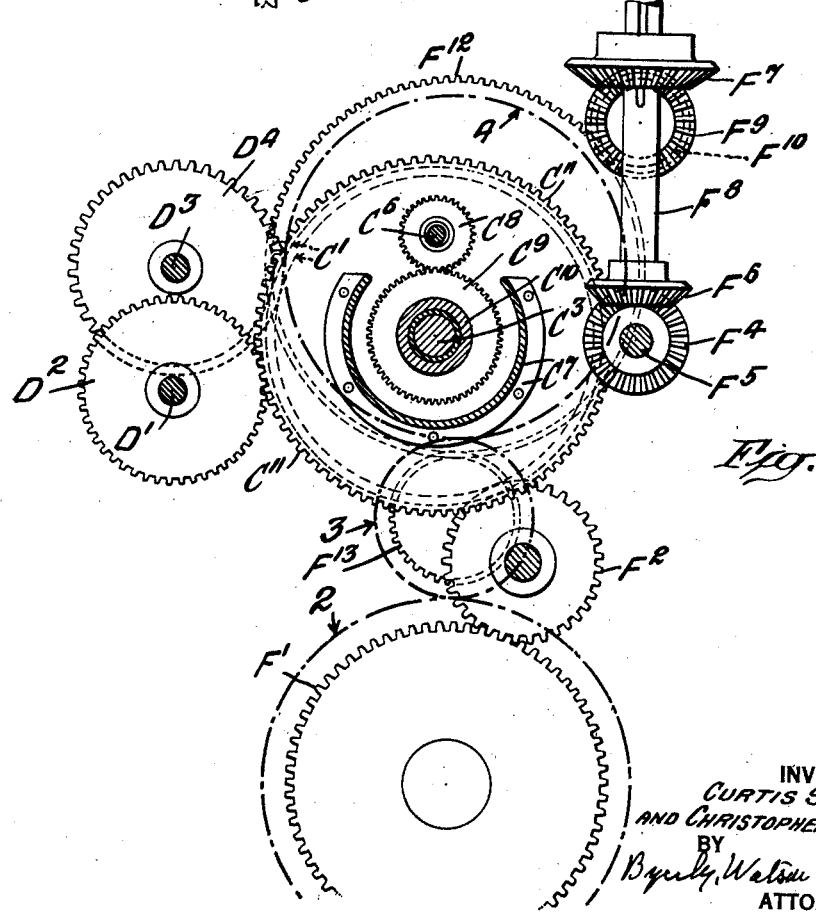
INVENTORS
CURTIS S. CRAFTS
AND CHRISTOPHER V. KNELL
BY
Byerly, Watson + Simonds
ATTORNEYS

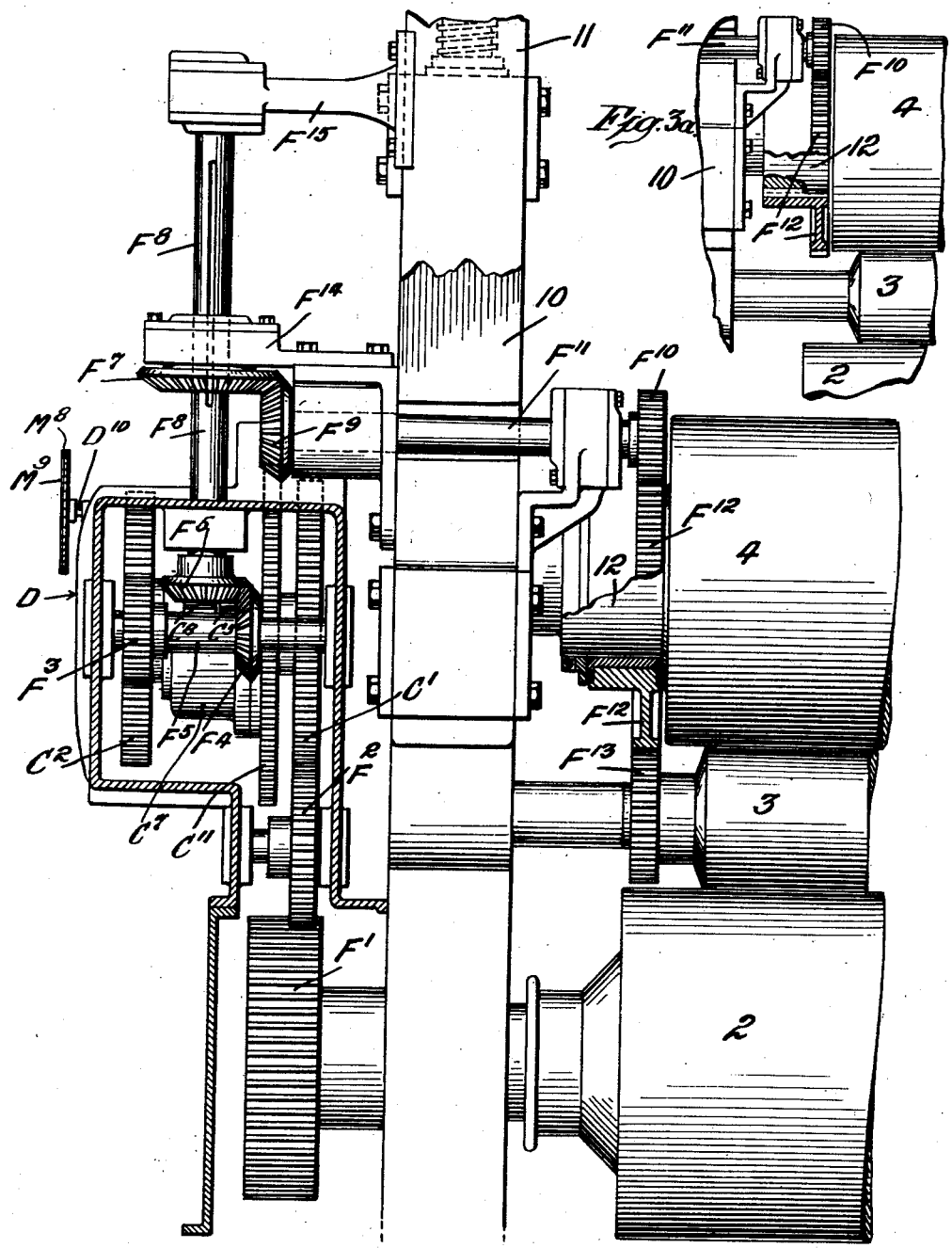

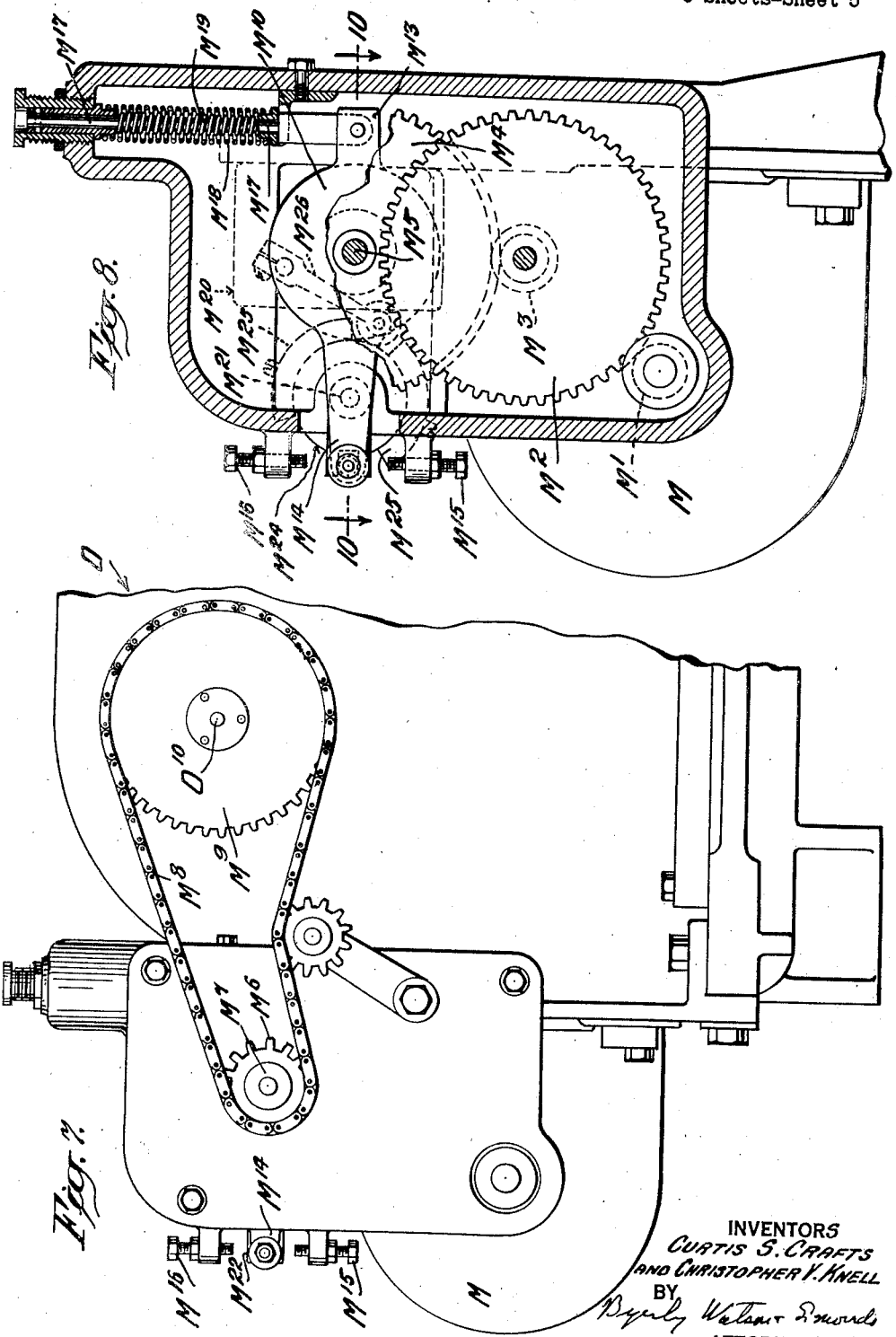

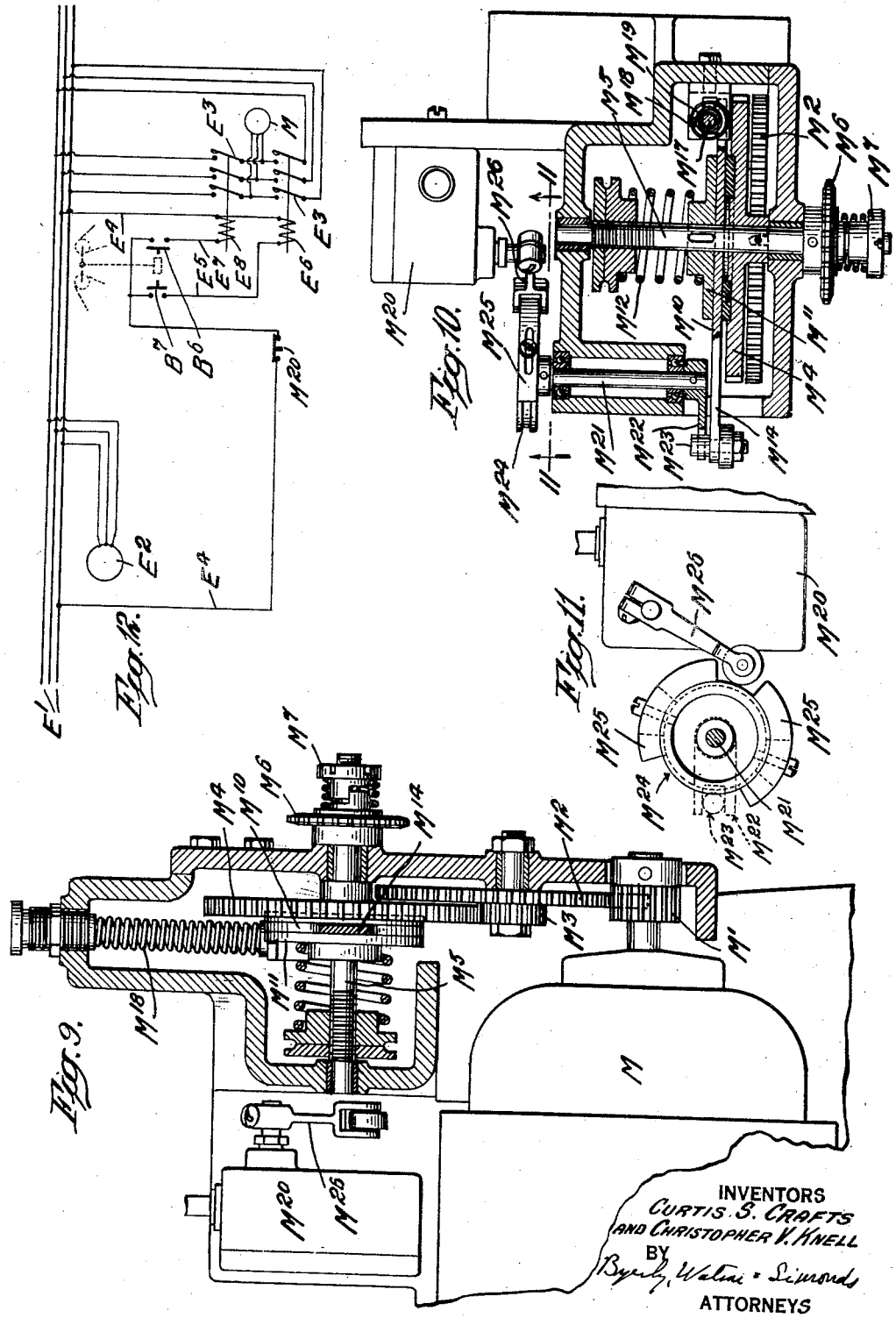

Patented Apr. 20, 1943

2,317,095

UNITED STATES PATENT OFFICE 2,317,095

METHOD AND MEANS FOR MAINTAINING REGISTER IN MULTIUNIT PRESSES

Curtis S. Crafts, Oak Park, and Christoper V. Knell, Glen Ellyn, Ill., assignors to News Syndicate Co., Inc., New York, N. Y., a corporation of New York Application December 27, 1940, Serial No. 372,020

7 Claims. (Cl. 101—152)

This invention relates to method and means for maintaining register in multi-unit presses and constitutes an improvement in the method and means for that purpose described in U. S. Patent No. 2,142,501, issued January 3, 1939, to Arthur Dultgen, et al.

The Dultgen et al. patent describes the use of variations in tension in the reaches of a web between the units of a multi-unit press to make the average rates of travel of the web through the units equal. The patent describes a governing mechanism controlled by differences in the tensions of different reaches of the web to vary the speed of web-moving members in such manner as to equalize the tensions of the reaches at opposite sides of each unit. The present invention also involves a tension-actuated governing means for changing the speed of the web-moving means of a unit so as to equalize the tensions of the reaches of the web at the two sides of the unit; but the governing mechanism of the present invention differs in two respects from that shown in the Dultgen et al. patent. In the first place, it causes only very gradual changes in the speed of the web-moving member of a unit so that all danger of straining or tearing the web is eliminated. In the second place, it is so arranged that, when equality of tension at the two sides of any unit has been restored, the web-moving means of that unit continues to be driven at the speed at which it was driven to effect the restoration, instead of being returned to its original speed. As a result, the governing means, after a comparatively short period of "hunting," sets the speed of the web-moving means of each unit at that necessary to maintain equality of tension and thus avoids the continual making of speed adjustments which is necessary with the mechanism shown in the Dultgen et al. patent.

The nature of the invention may clearly be understood from a detailed description of a practical apparatus embodying the invention applied to maintain register in a standard, multi-color, rotogravure press. Such apparatus is shown in the accompanying drawings, in which:

Fig. 3 is a fragmentary elevation looking lengthwise of the press and showing the gearing shown in Fig. 2.

Fig. 3a shows a modified gearing which drives the weight roller instead of the impression roller.

Fig. 4 is a fragmentary elevation looking in the direction of the arrow 4 of Fig. 2 and showing the variable-speed transmission with a part of its casing broken away.

Fig. 5 shows the planetary gearing in axial section.

Fig. 6 is a fragmentary elevation of the gearing shown in Figs. 2 and 3, showing also the planetary gearing sectioned on the line 6—6 of Fig. 5.

Fig. 7 is an enlarged extension of the right-hand side of Fig. 2 showing the casing for the reducing gearing connecting the adjusting motor with the controlling worm of the variable-speed transmission.

Fig. 8 is a further enlarged view of the gear casing shown in Fig. 7 with the casing broken away to show the gearing within it.

Fig. 9 is a view of the parts shown in Fig. 8 taken at right angles to Fig. 8 and showing the gear casing sectioned on the axis of the motor shaft.

Fig. 10 is a horizontal section on the line 10—10 of Fig. 8, and Fig. 11 is a fragmentary section on the line 11—11 of Fig. 10.

Fig. 12 is a diagram of the electric connections of the apparatus.

Figure 1:
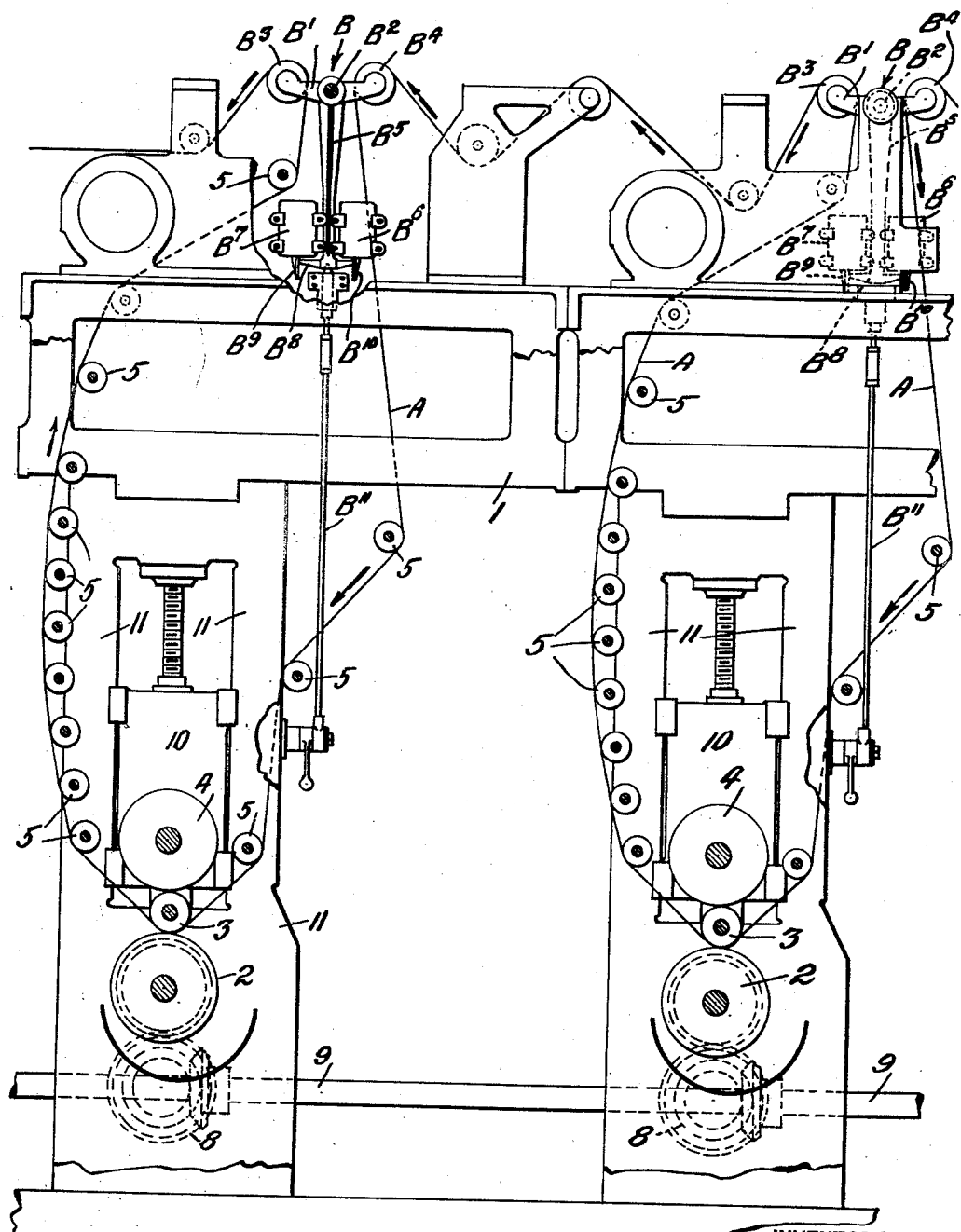
Fig. 1 is a fragmentary side elevation of a rotogravure printing press with a large part of one of the side frames broken away. This view shows two of the printing units of the press and a tension-controlled actuating means for each unit.
Figure 2:
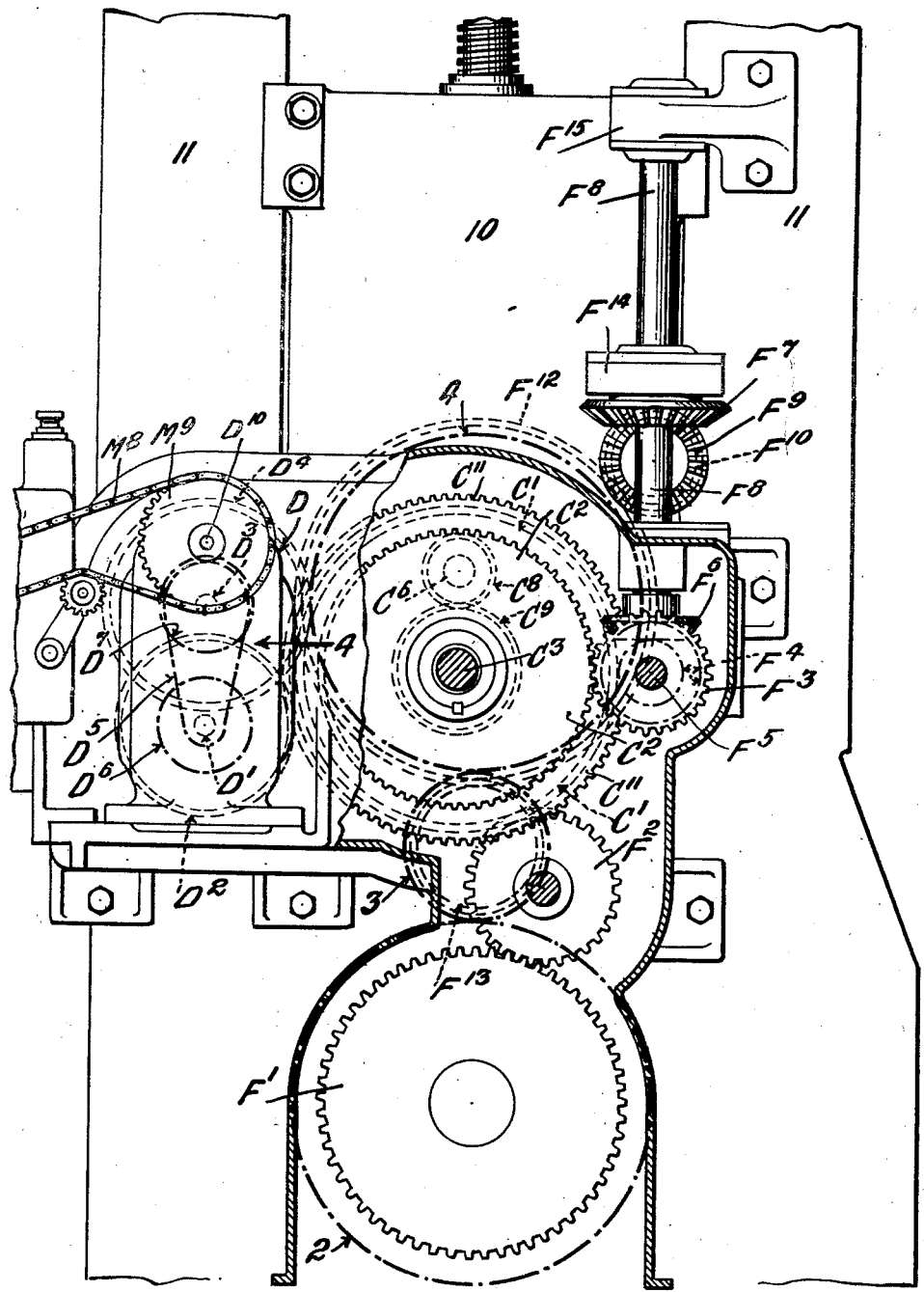
Fig. 2 is an enlarged fragmentary side elevation of the lower part of one of the units of the press with the gear casing broken away to show the gearing connecting the printing cylinder and the impression roller of the unit.

The printing press, two units of which are shown in Fig. 1, has a main frame 1 on which are mounted printing cylinders 2, impression rollers 3, weight or "back-up" rollers 4, and guide rollers 5 which guide a web A successively between the printing cylinders 2 and the impression rollers 3 of each of the units of the press. The printing cylinders 2 of all the units are driven at the same rotational speed by conventional gearing 8 connecting the shaft of each cylinder to a common drive shaft 9. To permit removal of the printing cylinders, the impression rollers and back-up rollers are journalled in the usual manner in slides 10 mounted in the side frames 11 of the press.

A tension-actuated control B is provided for each unit of the press. Each control B includes horizontal levers B1 pivoted on the frame of the press at B2 and carrying control rollers B3, B4 over which the web A passes in entering and in leaving the printing unit. An arm B5 depends from the lever B1 between two normally closed electric switches B6, B7. An operating head B8 at the lower end of the arm B5 is positioned to operate the control arm B10 of the switch B6 to close the switch B6 when the roll B3 is depressed and to close the switch B7 through its operating arm B9 when the roll B4 is depressed. A manual lock B11 may be provided to prevent swinging of the arm B5 while a web is being threaded through the press.

It is apparent that when the arm B5 is unlocked the lever and arm will respond to differences in tension between the reach of the web A entering one of the units and the reach of the web leaving this unit, so that, when the tension on the entering reach is greater than that on the leaving reach, the switch B7 will be closed, when the tension is the greater on the leaving reach, the switch B6 will be closed, and when the two tensions are equal both switches will remain open.

Electric circuits controlled by the switches B6, B7 of the control of each unit are used to cause gradual micrometric adjustment of the rate of travel of the web through the unit. This rate of travel depends upon the peripheral speed of the impression roller of the unit. The impression roller of each unit is mechanically driven through a planetary gearing C whose effective gear ratio is determined by a variable-speed transmission D whose gear ratio is adjusted by a reversible electric motor M connected in an electric circuit controlled by the switches B6, B7 in such manner that the motor is driven in one direction when the switch B6 is closed and in the other direction when the switch B7 is closed, and the motor is stationary when both are open.

The impression roller 3 of each unit is driven from the printing cylinder 2 of the unit through the planetary gearing C. The shaft of the printing cylinder 2 drives the input gear C1 of the planetary gearing C through gears F1 and F2. The output gear C2 of the planetary gearing C drives the impression roller 3 through a chain of gearing including pinion F3 and bevel gear F4 both fixed on a horizontal stub shaft F5, bevel gears F6 and F7 on a vertical shaft F8, bevel gear F9 and pinion F10 fixed on a horizontal stub shaft F11, gear F12 rotatably mounted on the end part 12 of the back-up roller 4, and gear F13 fixed on the shaft of the impression roller. In order that the gearing may not interfere with raising the slide 10 in which the shafts of the rollers 3 and 4 are mounted, the horizontal stub shaft F11 and a bearing for the bevel gear F7 are mounted on a bracket F14 which is mounted on the slide 10, and the gear F7 is splined on the vertical shaft F8 which is journalled in a bracket F15 secured to the side frame 11 of the press.

The planetary gearing C is best shown in Figs. 5 and 6. The input gear C1 is keyed to a central shaft C3. Also keyed to the shaft C3 is a sun gear C4 meshing with a planetary gear C5 fixed on a stub shaft C6 mounted on a cage C7 rotatable about the shaft C3. Another planetary gear C8 is fixed on the stub shaft C6 and meshes with a sun gear C9 fixed on a sleeve C10 rotatably mounted on the shaft C3. This sleeve C10 carries the output gear C2 of the planetary gearing. The two sun gears C4 and C9 differ slightly in pitch diameter and number of teeth, as do also the two planetary gears C5 and C8.

The effective gear ratio of the planetary gearing; that is, the relative rate of rotation of the input gear C1 and the output gear C2 depends, as is well understood, on the relative rate of rotation of the sun gear C4 and the cage C7. This relative rate of rotation is determined by the variable-speed transmission device D whose input shaft D3 carries a gear D4 meshing with and driven by the input gear C1 of the planetary gearing C, and whose output shaft D1 drives the cage C7 through a gear D2 fixed on the shaft and a gear C11 fixed on the cage.

The variable-speed transmission D provides for a gradual change of speed over a wide range. In the form shown in Fig. 4, the input and output shafts, D3 and D1, of the device are connected by a link belt D5 passing over pulleys D6, D7, whose effective diameters may be varied in opposite senses by turning levers D8 by means of a worm D10. The variable-speed transmission D may be of any suitable known construction, for example, of that shown in U. S. Patent No. 2,068,784, issued January 26, 1937, and is, therefore, not described in detail herein.

The controlling worm D10 of the transmission D is turned by the adjusting motor M whose operation is controlled by the switches B6 and B7 in the manner heretofore noted. The motor M is connected to the controlling worm D10 through reducing gearing best shown in Figs. 7, 8, 9 and 10. A pinion M1 on the motor shaft meshes with a large idler gear M2 on which is fixed a pinion M3 which meshes with a gear M4 splined to a shaft M5. A sprocket M6 is secured on the shaft M5 by a safety clutch M7 and this sprocket is connected by a chain M8 with a larger sprocket M9 fixed on the worm D10. Thus rotation of the motor in either direction turns the worm D10 at a rate of rotation very much less than that of the motor shaft.

To secure very accurate speed adjustment, damping means are provided to check turning of the worm as the result of the momentum of the motor armature and the associated gearing after current to the motor is cut off. The damping means include a friction disc M10 loosely mounted on the shaft M5 and sandwiched between the gear M4 and a disc M11 splined on the shaft M5 and pressed against the friction disc by a spring M12. The friction disc M10 has two radial arms M13 and M14. The arm M14 projects between two adjustable stops M15, M16 which limit the turning movements of the friction disc M10 by engagement with the arm M14 (Fig. 8). The arm M13 is secured to a plunger M17 provided with balanced compression springs M18, M19 which tend to restore the friction disc M10 to its normal position shown in Fig. 8 in which its arm M14 is midway between the stops M15 and M16.

The arm M14 of the friction disc M10 is connected to a normally closed electric switch M20 controlling the circuit of the motor M in such manner as to open this switch when the arm is moved in either direction through a distance somewhat less than that necessary to bring the arm into contact with one of the stops M15 or M16. The connection between the arm M14 and the switch M20 is best shown in Figs. 10 and 11. It includes a stud shaft M21 having at one end a fork M22 engaging a stud M23 on the arm M14 and at the other end a cam M24 with adjustable sectors M25 positioned to engage and move the operating lever M26 of the switch M20 whenever the shaft M21 is turned a short distance in either direction by the engagement of the fork M22 with the stud on the arm M14.

The operation of the mechanism connecting the adjusting motor with the worm D10 is to cause a turning of the worm by small, accurately predetermined steps. This is because the springs M12, M18 and M19 are so adjusted that the friction disc M10 turns with the shaft M5 when the shaft is turned, but is restored to its normal position shown in Fig. 8 by one of the springs M18, M19 when turning movement of the shaft M5 ceases. Consequently, when current is supplied to the adjusting motor M by the closing of one or the other of the switches B6, B7 and the motor starts to turn the shaft M5 and the worm D10 through the gearing which has been described, the friction disc M10 turns with the shaft until its arm M14 strikes one of the stops M15 or M16. Before the completion of this short turning movement, the arm M14 of the disc has acted through the parts mounted on the shaft M21 to open the switch M20 and cut off current to the motor. Notwithstanding the cutting off of the current, the inertia of the parts carries the disc M10 on until its arm M14 strikes one of the stops. The friction disc M10 is then held stationary and by the friction between it and the gear M4 quickly brings the shaft M5, and, of course, also the motor shaft and the worm D10, to a complete stop. One or the other of the springs M18, M19 then returns the friction disc to its normal position, allowing the switch M20 to close and re-energizing the motor if one of the switches B6 or B7 is still closed. The operation is then repeated producing another small turning step of the worm D10.

The electric circuit of the adjusting motor M is so arranged that the motor is idle when the normally closed switch M20 is open, and is turned in one direction when the switch M20 is closed and the switch B6 is closed, and is turned in the other direction when the switch M20 and the switch B7 are closed. The exact arrangement of the circuit will, of course, depend on the type of current available. A convenient circuit for a press driven from a three-phase line is shown in Fig. 12. This figure shows a three-phase line E1 to which the main motor of the press E2 is connected. This is the motor which drives the printing cylinders 2 through the drive shaft 9. The adjusting motor M is connected to the line E1 through a normally open reversing switch E3. A relay circuit E4 extends between two of the wires of the line E1. This circuit contains the normally closed switch M20 and has two parallel branches of which one, E5, contains the normally open switch B7 and a coil E6 for closing one-half of the reversing switch E3, and the other branch E7 contains the normally open switch B6 and a coil E8 for closing the other half of the reversing switch E3.

The operation of the apparatus described may most easily be explained by assuming that, when the press is started, the variable-speed transmission D of each unit is set with the ratio of the diameters of its two pulleys D6, D7 equal to the ratio of the diameter of the gears D4 and D2 on its input and output shafts, so that the cage C7 of the planetary gearing C of each unit is driven at the same speed as the main shaft C3 of the gearing, making the gear ratio of the planetary gearing equal to unity. Under these conditions, the impression rollers 3 of all the units are driven at the same speed of rotation, so that the web A would travel through all the units at the same rate if the diameters of all the impression rollers 3 were exactly the same. Exact equality between the diameters of the impression rollers cannot be obtained in practice, and in consequence differences in tension appear in the different reaches of the web.

To continue the explanation of the operation of the device, it will be assumed that the diameter of the impression roller 3 of one of the units is less than the diameters of the impression rollers of the units at each side of it. While the rotational speed of the impression rollers of the three units is equal, the web A will travel more slowly through the unit having the smaller impression roller than through the units at each side of it, so that the tension of the reach of the web leaving this unit will be increased, while the reach of the web entering this unit will slacken. The difference in tension between the entering and leaving reaches will cause the arm B5 to close the switch B6, starting the adjusting motor M in such direction as to change the pulley diameters of the transmission D to increase the speed of rotation of its output shaft D1, and thus to increase the speed ratio of the planetary gearing C slightly above unity. This slight increase will take place by minute steps because of the operation of the connection between the adjusting motor M and the controlling worm D10 of the transmission D, as has already been explained. The gradual increase in speed by small increments will continue until the impression roller 3 of the unit in question rotates fast enough to take up the slack on the entering reach of the web and to lessen the tension on the leaving reach, and thus restore the tensions of the reaches at opposite sides of the unit to equality. As soon as this happens, the switch B6 will close and stop the motor M, which stops the increase of the gear ratio of the planetary gearing C and the increase of speed of rotation of the impression roller 3. The impression roller will then continue to be driven at the speed at which it was driven when equality of tension was restored. This speed, it will be noted, is greater than the initial speed of the impression roller at which it was driven before the closing of the switch B6.

The web will now be traveling through the unit in question a little faster than it is traveling through the adjacent units, so that after a time a difference in tension between the entering and leaving reaches will develop which this time will operate to close the switch B7, to operate the motor M in a direction to decrease the speed of the output shaft of the variable-speed transmission D, and so gradually to decrease the gear ratio of the planetary gearing C. When the decrease of speed of the impression roller is stopped by restoration of equality of tension in the entering and leaving reaches, the speed of the impression roller will be slightly less than it was after the first adjustment and more nearly equal to the speed required to move the web through the unit in question at the same rate as that at which it is moving through the adjacent units. After a few operations of the mechanism in the manner described occurring at increasing intervals of time, the speed of the impression roller of the unit in question will be made, for all practical purposes, equal to that necessary to move the web through this unit as fast as it is moving through the adjacent units. The lever B1 and the motor M will then remain stationary.

The actual operation is slightly complicated by the fact that there will be differences in diameter between the impression rollers of all the different units, but the effect will be that, after a few automatic speed adjustments in each unit, the impression-roller driving mechanism of the various units will be set at the speeds required to move the web through each unit at the same speed and register will thus be continuously maintained without further adjustments. This desirable operation is the result of the fact that, on each restoration of equality of tension at the two sides of any unit, the speed of the impression roller is maintained at the speed to which it has been adjusted, and the fact that the speed adjustments are extremely gradual and accurate since wide changes in the speed ratio of the variable-speed transmission D cause only very slight changes in the gear ratio of the planetary gearing C.

While the speed-adjusting mechanism described performs its function near the beginning of a printing run so that it may not be required to operate at any appreciable extent thereafter, it is nevertheless always in readiness to operate in case equality of tension at the two sides of any unit is disturbed during the run, as may occur as the result of a slight change in the diameter of one of the impression rollers through a change in temperature or through wear.

A modification of the apparatus shown in Fig. 3a makes the speed of travel of the web through the various units independent of the diameters of the impression rollers 3. This modification consists in fixing the gear F12 on the back-up roller 4 and omitting the gear F13 on the impression roller shaft. In this modification the impression roller is driven by frictional contact with the back-up roller so that the peripheral speed of the impression roller is equal to the peripheral speed of the back-up roller. In this case, the differences in tension in different reaches of the web which arise before the adjusting mechanism operates are caused by minute differences in diameter between the back-up rollers 4 of the various units instead of by differences in diameter in the various impression rollers. As the back-up rollers are metal, it is possible to make and maintain their diameters more uniform than the diameters of the impression rollers which are rubber. The use and modification shown in Fig. 3a, therefore, requires somewhat less operation of the adjusting mechanism to secure continued uniformity in tension than the arrangement first described; but, on the other hand, it does not control the speed of the web through the different units as positively as the form first described in which the adjusting mechanism is geared directly to the impression rollers.

It will be apparent to those skilled in the art that many changes and modifications may be made in the particular apparatus described without departing from its essential characteristics; and that this apparatus and modifications of it may be applied to printing presses in various ways whenever a micrometric speed adjustment is desired in order to maintain the register of different units.

What is claimed is:

1. A method of maintaining register in a multi-unit, rotary, web printing press in which a web-moving means is associated with each unit, which consists in utilizing inequalities in the tensions of the reaches of the web at the intake and discharge sides of a unit to cause a gradual change in the peripheral speed of the web-moving means of the unit to restore said tensions to equality, and in maintaining the peripheral speed of the web-moving means at the value which it had on the restoration of equality for so long as such equality continues.

2. In a device for maintaining register in a multi-unit, rotary, web printing press, a variable-speed transmission connected between the printing cylinder and the web-moving means of a unit of the press, a second variable-speed transmission connected to the printing cylinder and to the first variable-speed transmission in such manner that a wide variation in the second transmission causes a slight variation in the first transmission, and means for controlling the second transmission.

3. In a device for making adjustments in the speed of rotation of a roller of a printing press, the combination with a drive for said roller containing a variable-speed transmission having a movable member for controlling its gear ratio, a reversible electric motor and a driving connection between said motor and said controlling member, of means for causing said motor to effect a step-by-step movement of said controlling member in either direction, comprising a damping member in frictional contact with a rotary element of the driving connection and mounted for a limited turning movement about the axis of said element, balanced springs urging the damping member to the middle of its arc of movement when said rotary element is stationary, an electric switch controlling the supply of electricity to the motor, and means actuated by the damping member to open said switch at an intermediate point of a turning movement of the damping member from its central position to its extreme position in either direction and to close said switch on return of the damping member to its central position.

4. An intaglio, web printing press, comprising a number of units each of which includes a printing cylinder, a soft impression roller and a hard back-up roller resting on the impression roller, a main drive, positive driving connections between the main drive and the printing cylinders, the gear ratios of said connections being fixed and equal so that the printing cylinders are all driven at the same rotational speed, positive driving connections between the main drive and the back-up rollers, and a micrometrically adjustable variable-speed transmission in the driving connection to each back-up roller to permit separate and very accurate adjustment of the speed of each back-up roller.

5. In a multi-unit, intaglio, web printing press in which each unit includes a printing cylinder, a soft impression roller and a hard back-up roller resting on the impression roller, the combination with means for driving all the printing cylinders at the same rotational speed, of a separate positive driving connection to each back-up roller, and a micrometrically adjustable, variable-speed transmission in each of said driving connections to permit separate and very accurate adjustment of the speed of each back-up roller.

6. An intaglio, web printing press, comprising a number of units each including a printing cylinder, a soft impression roller and a hard back-up roller resting on the impression roller, a main drive, positive driving connections between the main drive and the printing cylinders, and positive driving connections between the main drive and the back-up rollers, the gear ratios of the driving connections to the back-up rollers being so related to the gear ratios of the driving connections to the printing cylinders that the peripheral speeds of the back-up rollers are substantially the same as the peripheral speeds of the printing cylinders.

7. In an intaglio, web printing press, the combination with a printing unit comprising a power-driven printing cylinder over which the web is passed, soft impression means in contact with the back of the web and a high inertia weight urging the soft impression means towards the printing cylinder, of a positive gear connection between the printing cylinder and the weight to prevent the inertia of the weight from causing slippage between the impression means and the cylinder on changes in the speed of the cylinder.

CURTIS S. CRAFTS.
CHRISTOPHER V. KNELL.